United States Patent [19]
Ichikawa et al.

[11] Patent Number: 5,620,217
[45] Date of Patent: Apr. 15, 1997

[54] BUMPER ASSEMBLY FOR FOUR WHEEL VEHICLE

[75] Inventors: Makoto Ichikawa; Eiji Kato; Yoshihiro Morishita, all of Iwata, Japan

[73] Assignee: Yamaha Hatsudoki Kabushiki Kaisha, Iwata, Japan

[21] Appl. No.: 424,803

[22] Filed: Apr. 19, 1995

[30] Foreign Application Priority Data

May 12, 1994 [JP] Japan ................................. 6-122087

[51] Int. Cl.⁶ ............................................ B60R 19/52
[52] U.S. Cl. .......................... 293/102; 293/115; 293/155; 180/68.6; 280/798
[58] Field of Search ....................... 293/102, 105, 293/113, 115, 154, 155; 296/78.1, 180.1, 205; 180/68.1, 68.3, 68.4, 68.6; 280/796, 798, 282.2, 88.2, 154, 848

[56] References Cited

U.S. PATENT DOCUMENTS

| | | | |
|---|---|---|---|
| 4,535,869 | 8/1985 | Tsutsumikoshi et al. | 280/282 X |
| 4,667,765 | 5/1987 | Tomoyuki | 280/798 X |
| 4,687,069 | 8/1987 | Inomata et al. | 180/68.4 X |
| 4,798,409 | 1/1989 | Miller | 293/102 X |
| 4,892,165 | 1/1990 | Yasui et al. | 280/798 X |

*Primary Examiner*—Andrew C. Pike
*Attorney, Agent, or Firm*—Knobbe, Martens, Olson & Bear LLP

[57] ABSTRACT

A four wheeled vehicle has a tubular frame assembly, a front body cover detachably connected to the frame assembly, and a front bumper detachably connected to the frame assembly. The front bumper is of tubular construction and has a pair of spaced-apart side members extending through openings in the front body cover. The front body cover is configured so that water flowing across it will be directed downwardly and discharged away from the seat of the vehicle and away from an induction system air inlet that is disposed beneath the seat.

14 Claims, 8 Drawing Sheets

BUMPER ASSEMBLY FOR FOUR WHEEL VEHICLE

BACKGROUND OF THE INVENTION

This invention relates to a bumper assembly for a vehicle and more particularly to an improved bumper and front cover assembly for a vehicle.

There is a popular type of vehicle that is constructed similarly to a motorcycle but which includes at least a pair of front dirigible wheels. As is typical with this type of vehicle, the frame is made up of a welded up assembly that includes primarily a plurality of tubular members. Generally, there is provided a front cover that includes front fenders and a front body portion with the front fenders overlying the front wheels. This front cover may be comprised of a multiple part or single part assembly and is normally mounted on the frame. In addition, it is the practice to provide a front bumper assembly and this front bumper assembly should also be attached to the frame so as to provide good rigidity.

However, this presents certain problems in connection with attachment of the front cover and bumper assembly to the frame and without transmitting undue loads to the front cover. In addition, many accessories such as headlights, heat exchangers, etc. are carried by the vehicle front end and this further compounds the problems of assembly and strength.

It is, therefore, a principal object of this invention to provide an improved front bumper assembly for a vehicle of this type.

It is a further object of this invention to provide an improved bumper and frame assembly wherein the bumper can be readily detached from the frame and also wherein the front cover can be removed without removing the handlebar assembly.

This type of vehicle normally employs a single straddle-type seat which accommodates the rider and possibly a passenger seated in tandem fashion before the rider. Aside from this, there is very little protection for the rider. Thus, the vehicle may be operated at times in rain or in very wet conditions. With the type of seat assembly normally employed, this means that the seat may receive a large amount of water which is obviously undesirable.

It is, therefore, a still further object of this invention to provide an improved seating assembly for such a vehicle and wherein the seat assembly is constructed in such a way so as to channel water away from rather than toward the seat so the water can be easily drained.

SUMMARY OF THE INVENTION

This invention is adapted to be embodied in a motor vehicle that is comprised of a tubular frame assembly mounted on a pair of front wheels and at least one rear wheel by a suspension. A front cover is comprised of a pair of front fenders each overlying a respective one of the front wheels and an intermediate portion which bridges and integrally connects the fenders in overlying relationship to a forward portion of the tubular frame assembly. A front bumper of tubular construction has a pair of spaced-apart sections that extend through openings in the front cover and which are detachably connected to the tubular frame assembly.

DETAILED DESCRIPTION OF THE PREFERRED EMBODIMENT OF THE INVENTION

Figure 1:
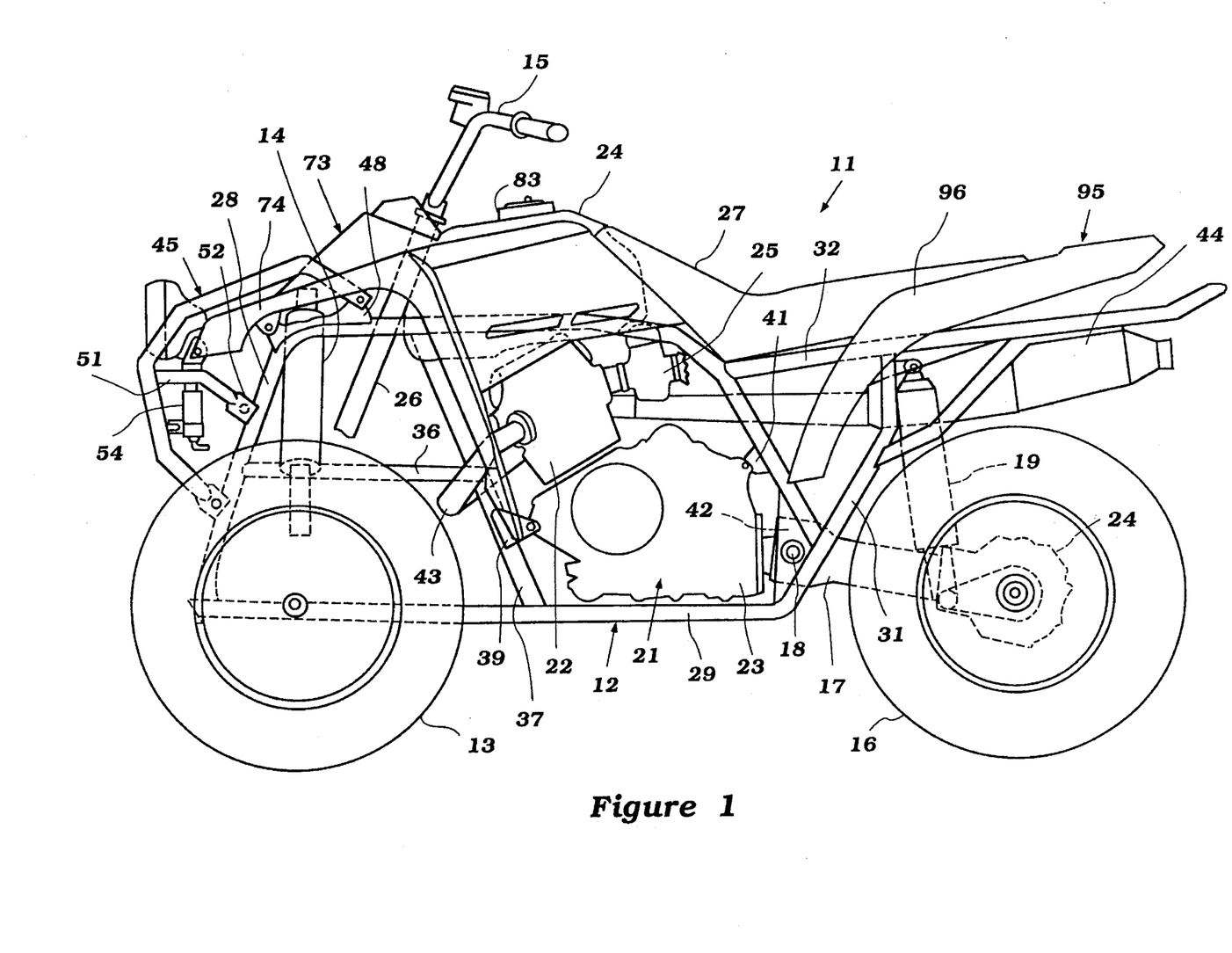
FIG. 1 is a side elevational view of a four wheel vehicle constructed in accordance with an embodiment of the invention.

Referring now in detail to the drawings and initially to FIG. 1, a four wheel vehicle constructed in accordance with an embodiment of the invention is shown and identified generally by the reference numeral 11. The vehicle 11 includes a frame assembly 12 that journals a pair of front wheels 13 for suspension movement by means including suspension elements 14 that are loaded in a known manner between the wheel suspension for each wheel 13 and the frame 12. This suspension also includes an arrangement whereby the wheels 13 are dirigible and a handlebar assembly 15 is carried by the frame 12 for steering of these front wheels 13 in a known manner.

In addition, there are provided a pair of rear wheels 16 which are also suspended by the frame 12. This suspension includes a trailing arm assembly 17 having a pivotal connection to the frame 12 indicated at 18. A suspension element 19 is interposed between the trailing arm 17 and the frame 12 for suspension movement of the rear wheels 16.

A propulsion unit, indicated generally by the reference numeral 21, is suspended in the frame 12 in a manner which will be described. The propulsion unit 21 includes an internal combustion engine 22 which, in the illustrated embodiment, is of the single cylinder type. Although this type of engine is described, it will be readily apparent to those skilled in the art how the invention can be practiced with engines having other cylinder numbers and cylinder types, as is well known in this art. The propulsion unit 21 also includes a transmission, crankcase assembly 23 that carries a change speed transmission and which drives the rear wheels 16 through a driveshaft (not shown) that extends through the trailing arm 17 and which drives a final drive 24 that may include a differential for driving the rear wheels 16.

A fuel tank 24 is carried by the frame assembly 12 above the engine 22 and supplies fuel to a carburetor 25 or other charge former for the engine 22 in a well-known manner. The fuel tank 24 is disposed behind a headpipe 26 on which the handlebar assembly 15 is journaled in a known manner.

A straddle-type seat 27 is carried by the frame assembly 12 to the rear of the fuel tank 24 and is adapted to accommodate one or more riders seated in straddle fashion. If more than one rider is accommodated, they are seated in tandem fashion.

The frame assembly 12 will now be described in more detail by particular reference to FIGS. 2–4 in addition to FIG. 1. This frame assembly includes a pair of generally inverted U-shaped, main frame members 28 which are formed from tubular pieces, as are the bulk of the frame members. The main frame members 28 are joined at their lower ends to a pair of transversely spaced-apart lower tubes 29 which extend generally in a horizontal direction from slightly before the lower front end of the main frame members 28 back to the pivot point 18 where they have a kick-up portion 31 to which the rear end of the main frame members 28 are affixed.

A pair of seat rails 32 are connected between the kick-up portions 31 and the rearward portions of the main frame members 28 on which the seat 27 is supported in a known manner.

A plurality of transversely extended cross-pieces, such as a pair of front cross-pieces 33 and 34 and a mid cross-piece 35, extend between and join the lower frame tubes 29 so as to provide a more rigid assembly. A generally U-shaped cross-piece 36 is connected at its forward ends to the main frame members 28 between their upper and lower ends and extends rearwardly for connection to a further centrally positioned frame member 37 which extends upwardly from the cross-piece 35 and is connected at its upper end to a further cross-piece 38 that spans the upper ends of and is connected to the main frame members 28. The headpipe 26 is connected in a suitable manner to the frame assembly 12 in this area.

As has been noted, the propulsion unit 21 is supported suitably within the frame assembly 12. This support is comprised of a first bracket 39 that is affixed to the frame tube 37 and which supports the front of the propulsion unit 21. The rear of the propulsion unit 21 is supported by means of a pair of brackets 41 that are affixed to the downwardly extending portions of the main frame members 28. Additional supports may also be provided, if desired.

The propulsion unit 21 is supported in the frame assembly 12 in the area defined between the frame member 37 and encompassed by the rear portions of the frame members 28 and 29, particularly where they join, at a bracket 42 that provides the pivotal journal 18 for the trailing arm 17.

The engine 22 has a forwardly facing exhaust port to which an exhaust pipe 43 is affixed. The exhaust pipe 43 extends forwardly around the frame member 37 and then rearwardly terminates in a silencer 44 disposed at one side of the vehicle 11.

Figure 5:
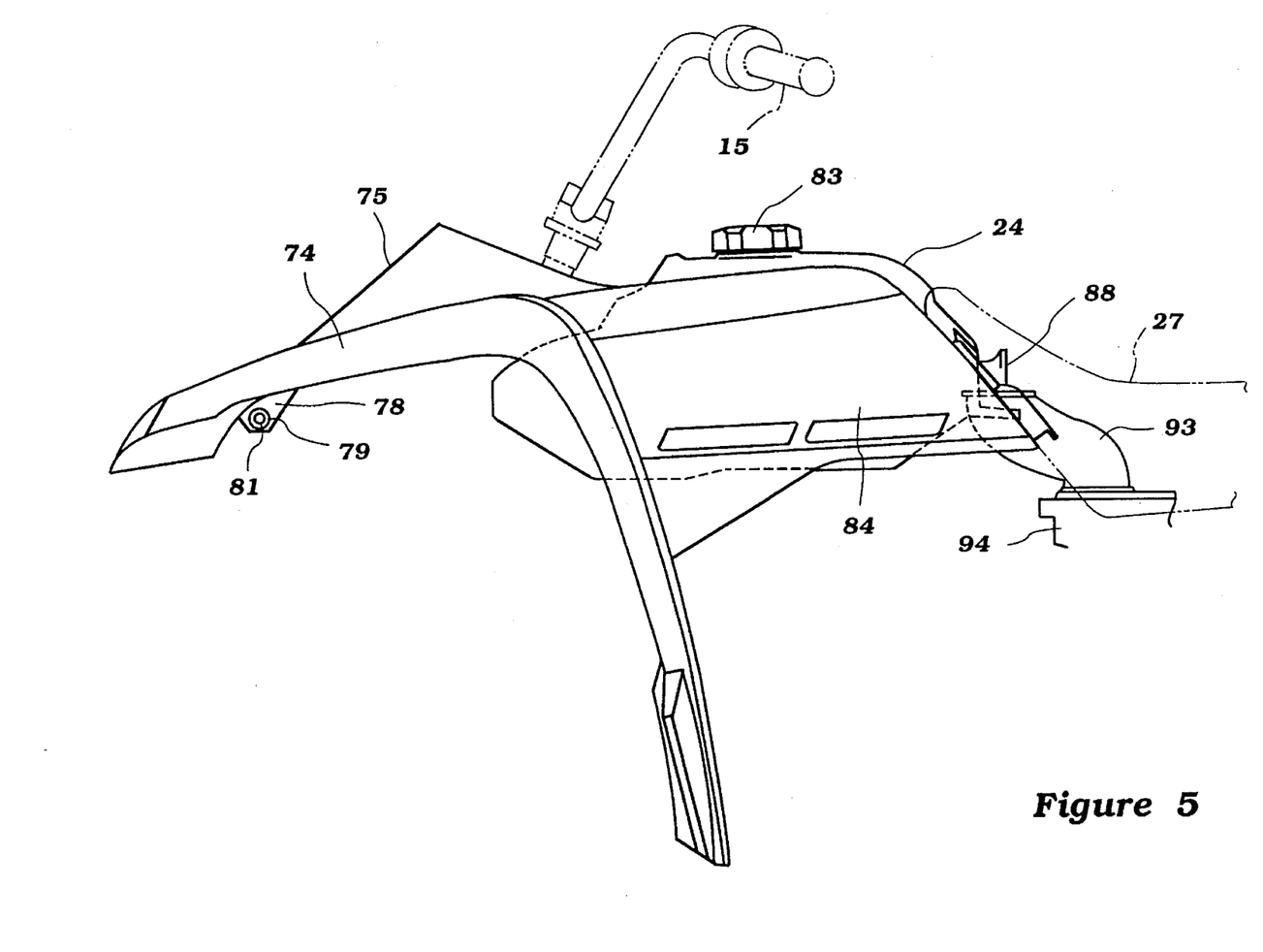
FIG. 5 is a side elevational view, in part similar to FIG. 2, but shows the front cover in solid lines and other portions of the body in solid lines with the frame removed and other components shown in solid lines.

As has been noted, the carburetor 25 is disposed to the rear of the engine 22. It draws air from an air silencer assembly which will be described later by reference to FIG. 5 that is disposed between the seat rails 32. The inlet arrangement for the air silencer and its protection from water will be described later by reference to FIGS. 5–8.

In accordance with an important feature of the invention, a bumper assembly, indicated generally by the reference numeral 45, is provided at the front of the vehicle 11 forwardly of the front wheels 13 and disposed in part vertically above them. The bumper assembly 45 is directly connected to the frame 12 so as to transmit loads directly therebetween.

This bumper assembly 45 includes a pair of side pipes 46 which have a generally C-shape and are connected at their lower ends by means of brackets 47 to the downwardly extending part of the main frame member 28 adjacent but above the point where it is connected to the lower frame pipes 29. At the upper end, the bumper side pipes 46 are connected to brackets 48 which are welded to the upper portion of the main frame member 28 where it transitions from its vertically extending portion to its horizontally extending portion so as to provide a greater strength at the point of connection.

A first cross-piece 49 extends across the width of the bumper assembly 45 between the midpoints of the main side pipes 46. Adjacent the ends of the crosspiece 49 a pair of rearwardly extending tubes 51 are connected to the main frame member 28 by connections 52 so as to provide further rigidity. A second, lower cross-piece 53 extends between the lower portions of the side pipes 46 and is rigidly connected, as by welding thereto, so as to add further rigidity to this assembly.

An oil radiator 54 or other type of heat exchanger is mounted to the cross-members 49 and 53 behind them. This mounting comprises a pair of lower support brackets 55 that are welded at spaced locations to the bumper cross member 53 and an upper support bracket 56 that is carried by the side pieces 51 of the upper bumper cross member 49. A protective grill 57 is mounted across the bumper cross-members 49 and 53 so as to provide protection for the heat exchanger or radiator 54.

The lower portion of the engine and particularly its crankcase transmission assembly 23 contains an oil pump which delivers lubricant to the oil radiator 54 through a flexible conduit 58. Lubricant which has passed through the radiator 54 is returned to the crankcase assembly 23 through a return flexible conduit 59. A retaining clip 61 retains the conduits 58 and 59 in place and is strapped around the main frame member 36.

The radiator support bracket 56 has affixed to it a pair of U-shaped brackets 62. These brackets 62 support, among other things, a pair of headlights 63. The headlights 63 are thus positioned on the bumper assembly 45 but at a point positioned rearwardly and above the upper cross-member 49. This places the headlights 63 in a protected place but also in a place where the light emanating from them will not be obstructed.

Figure 2:
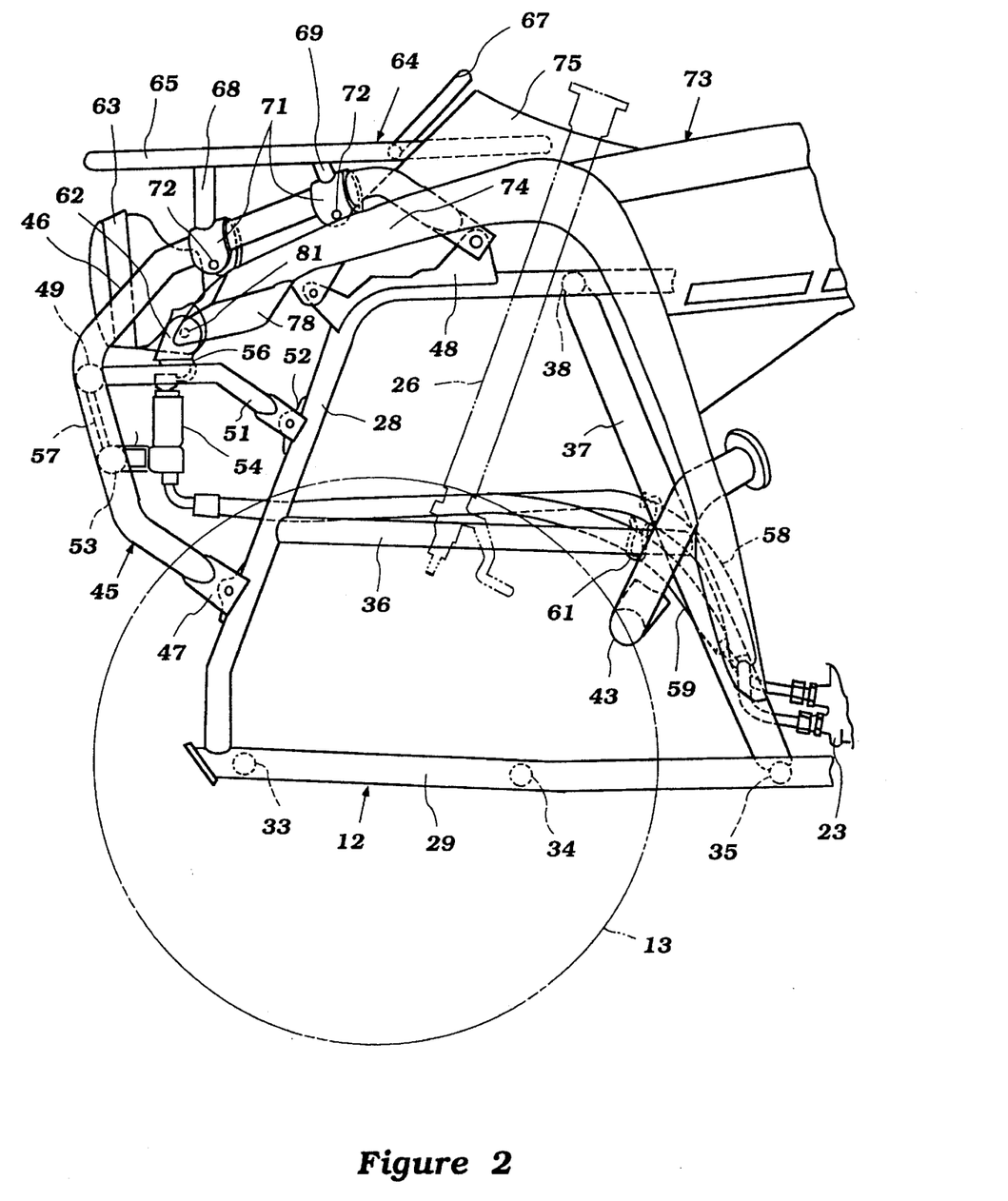
FIG. 2 is an enlarged side elevational view of the forward portion of the vehicle and shows the attachment of the bumper and front cover to the frame and an optional front carrier attached.
Figure 3:
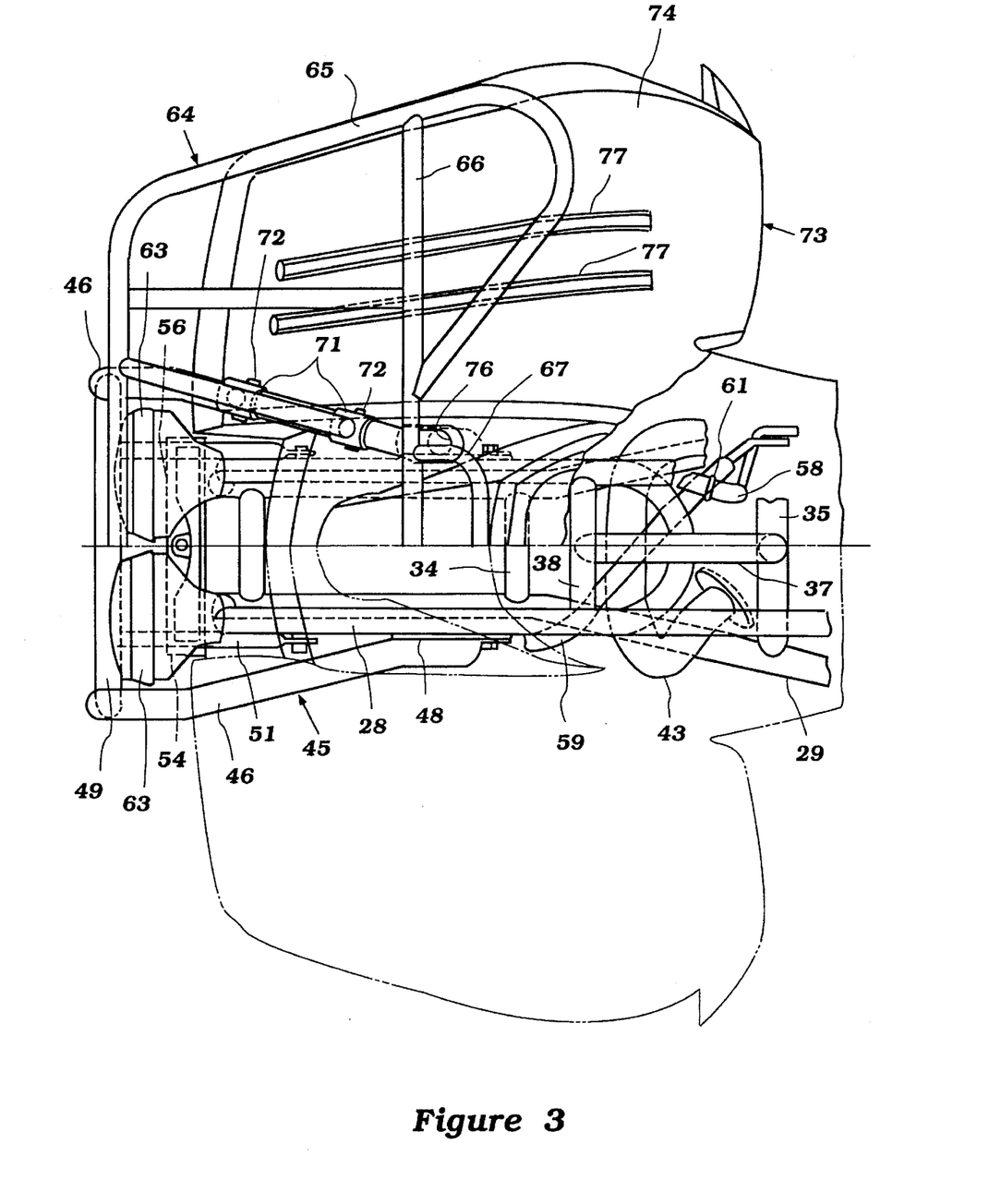
FIG. 3 is a top plan view of the area shown in FIG. 2 with a portion of the front fender shown in phantom to illustrate more clearly the frame construction.
Figure 4:
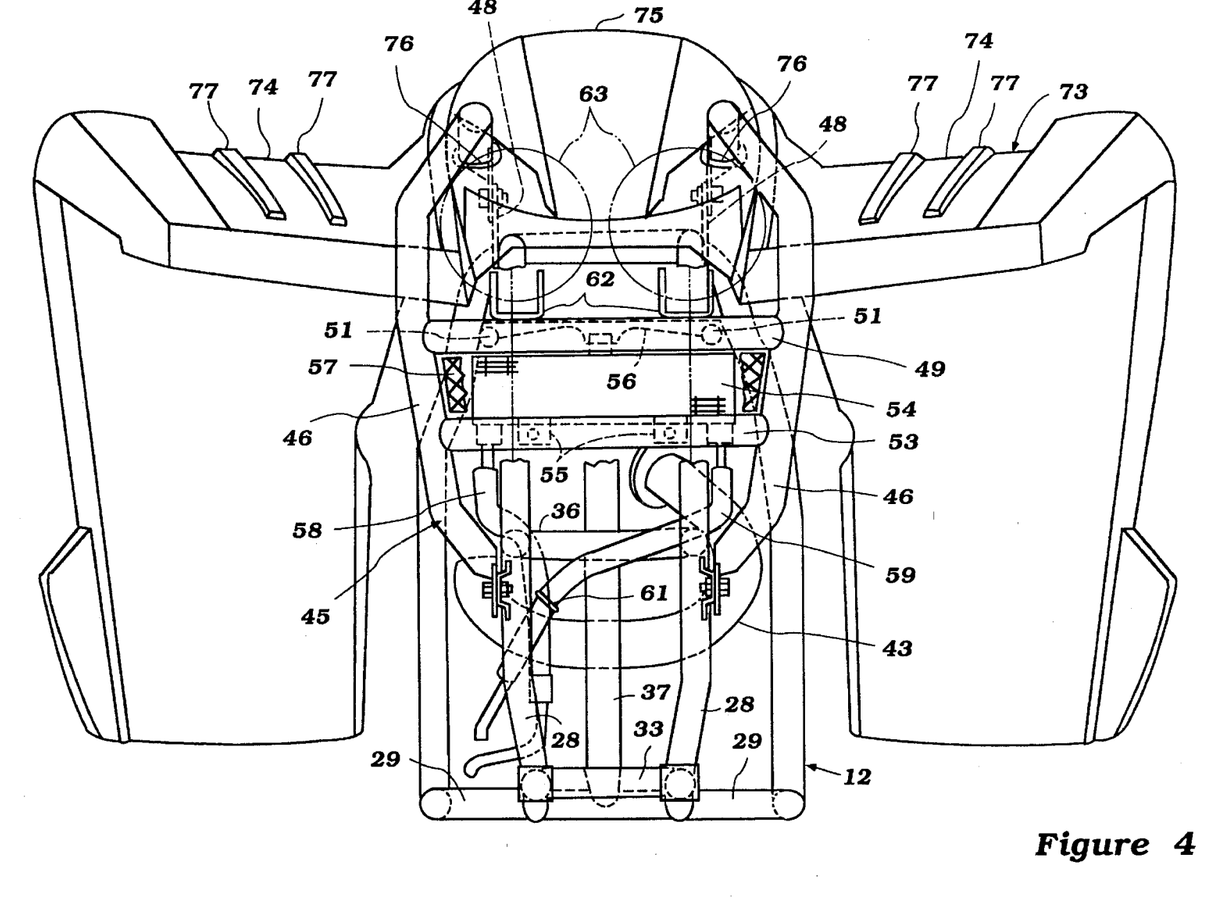
FIG. 4 is a front perspective view of the structure shown in FIGS. 2 and 3 but with the wheels removed so as to more clearly show the configuration of the front cover.

An optional first luggage carrier, shown in FIGS. 2 and 3 and identified generally by the reference numeral 64, may be detachably connected to the bumper assembly 45 so as to offer luggage carrying capacity. This luggage carrier 64 is comprised of an outer tubular member 65 which is formed into a generally B-shaped configuration and is provided with a reinforcing cross-member 66. A small rack portion 67 of generally U-shape is affixed to the cross-member 66 and extends rearwardly and upwardly, as shown in FIG. 2, so as to provide a tiedown connection for carried goods and also to ensure that these goods cannot slip.

Pairs of support rods 68 and 69 are affixed suitably to the carrier 64 and have clamps 71 at their lower ends that are adapted to be engaged with the bumper side pipes 46 and held thereto by clamp-type fasteners 72 so that the carrier 64 may be easily attached and detached.

Figure 6:
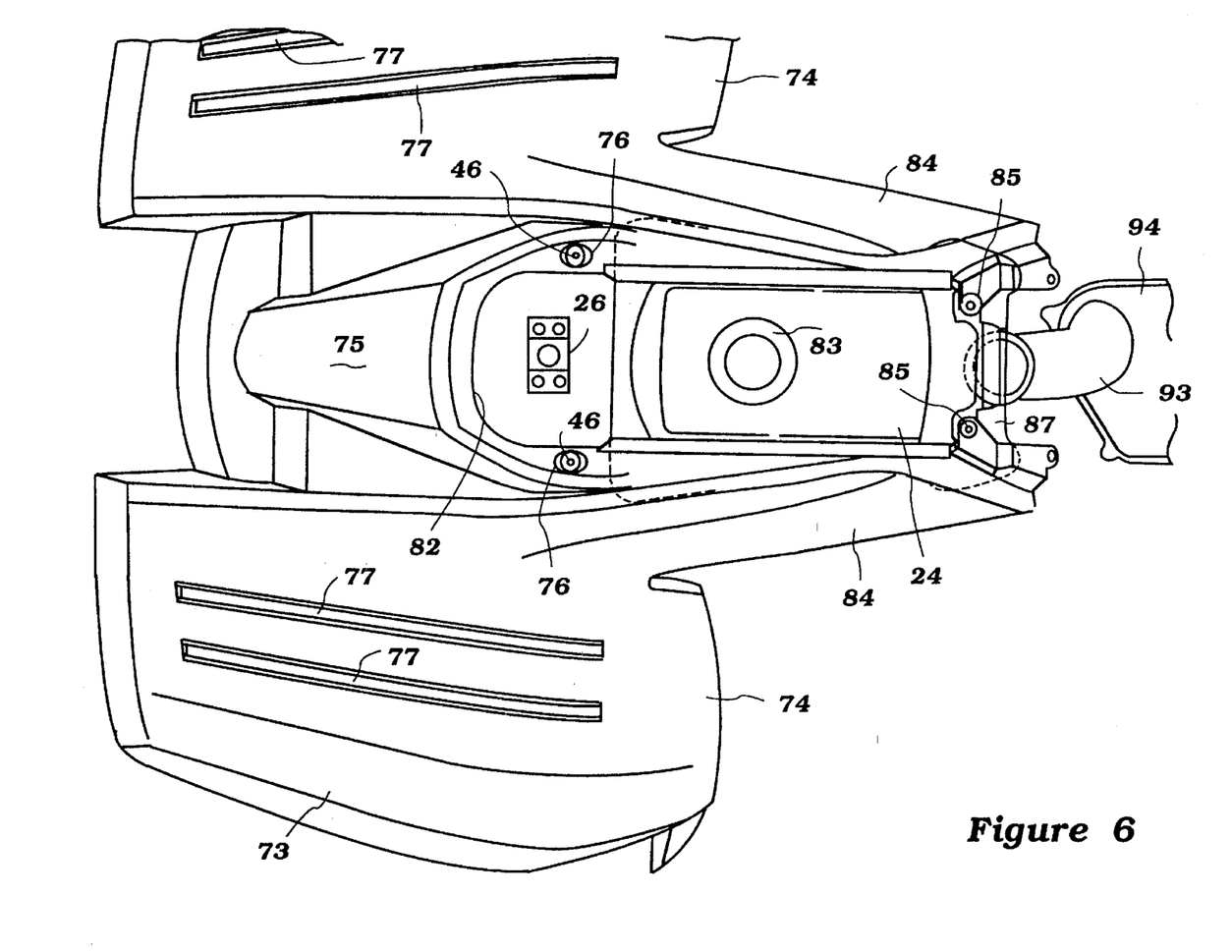
FIG. 6 is an enlarged top plan view of the area shown in FIG. 5.

A front cover, indicated generally by the reference numeral 73 and shown in most detail in FIGS. 1–6, is connected to and forms a part of the vehicle 11. The front cover 73 is supported by the main frame assembly 12. This front cover 73 is formed from a suitable material, such as a fiberglass reinforced resin or the like. The front cover 73 is provided with a pair of fender portions 74 which extend over the respective front wheels 13 and above the main frame assembly 12 and in part below the bumper assembly 45. The fender assemblies 74 are integrally connected to a central body portion 75 which forms a cowling over the front of the frame assembly 12 forwardly of the headpipe 26 and between the fenders 74. This main body portion 75 is provided with a pair of openings 76 through which the rear portion of the bumper side tubes 46 pass, as best seen in FIGS. 3 and 6.

The fender portions 74 are formed with upper stiffening ribs 77 which add to their rigidity. On the underside thereof, the fender portions 74 are formed with depending lugs 78 that form openings or bosses 79 for receiving a fastener 81 (FIG. 5) to attach them to the frame brackets 48. Thus, the front cover 73 is connected to the vehicle through the frame assembly 12. Thus, the front cover may be removed, along with the bumper assembly, or alternatively, the bumper assembly may be removed independently of the front cover 73.

At the rear portion, the central part 75 of the front cover 73 is provided with an elongated opening 82 that passes the headpipe 26 and also affords access to the fuel tank 24 and particularly a filler cap 83 thereof. This central body part 75 has a rearwardly extending portion 84 which extends back and along the sides of the opening 82 and provide a construction which cooperates with the seat 27 so as to provide a water collecting channel with the fuel tank 24 so that water that impinges on the body will be directed away from and drained away from the seat 27. This construction may be best understood by reference to FIGS. 5–8.

Figure 7:
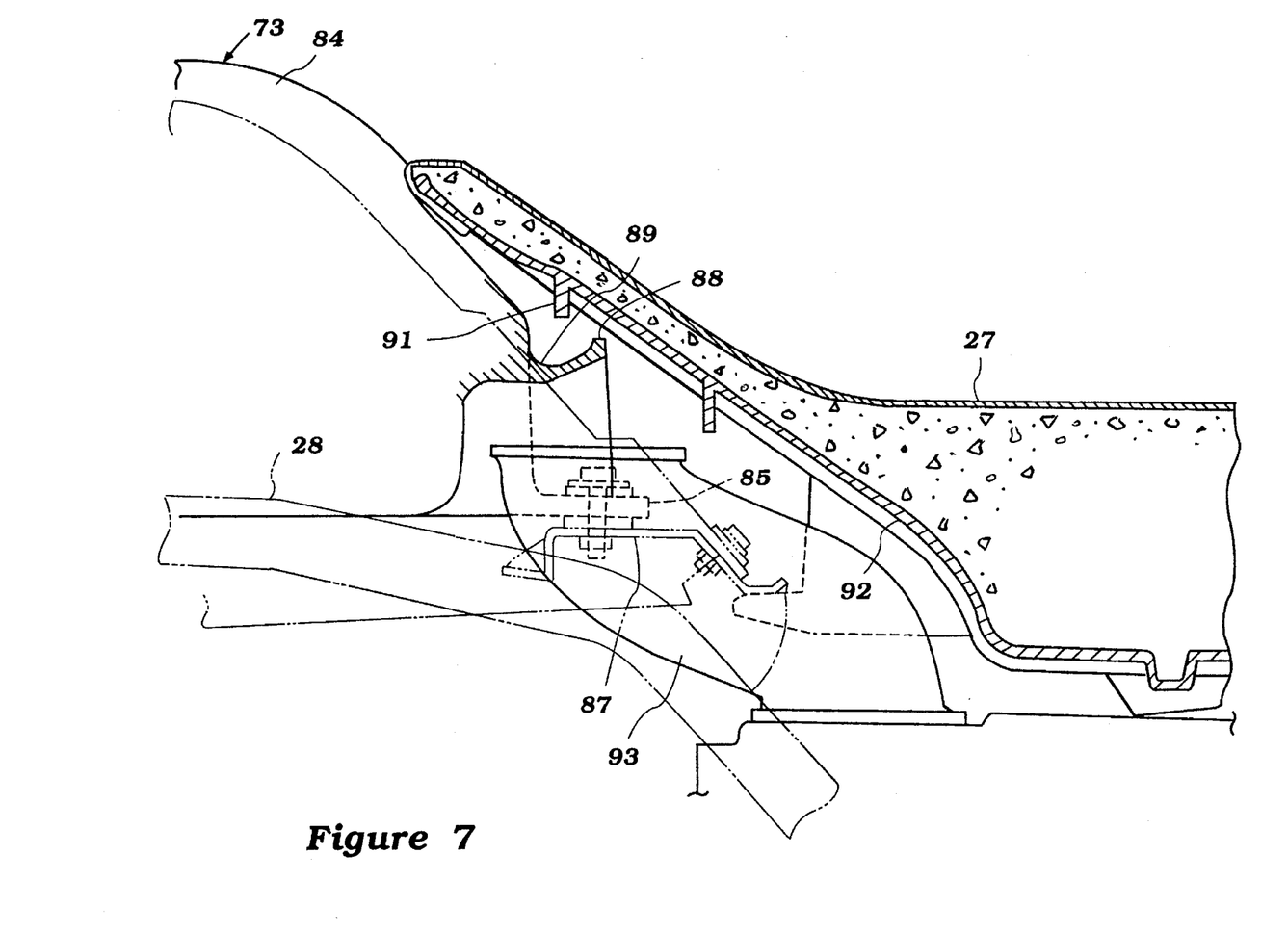
FIG. 7 is a cross-sectional view taken through the forward portion of the seat assembly and shows how the front cover and fuel tank are configured to accumulate rain water and drain it away from the seat and engine air inlet.
Figure 8:
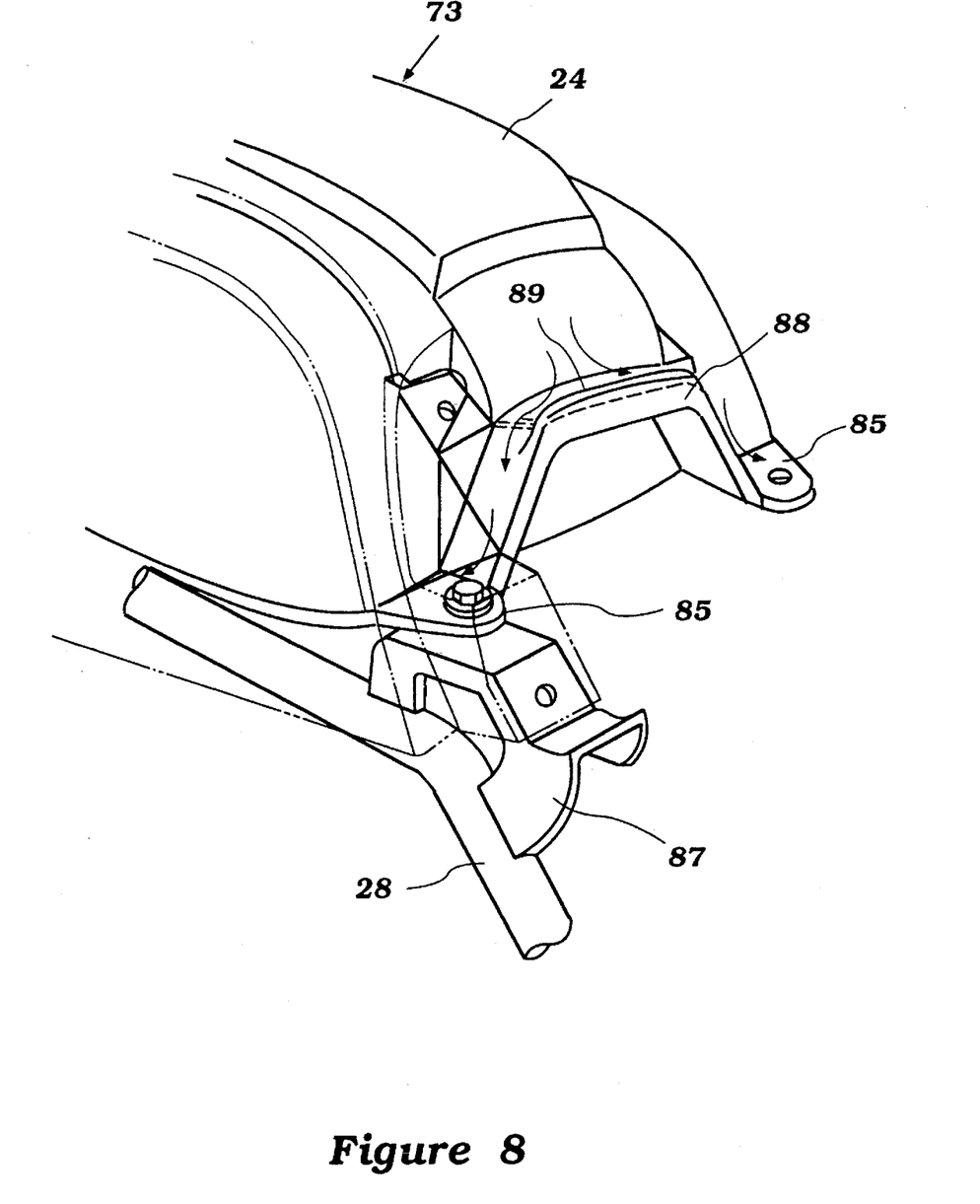
FIG. 8 is a perspective view looking from one side and from the rear, with the seat removed, to show how the front cover is configured so as to assist in draining water away from the seat.

As may be seen primarily in FIGS. 7 and 8, the rear portion 84 of the front cover 73 has a pair of rearwardly extending tabs 85 that pass threaded fasteners so as to affix the rear part of the front cover 73 to a pair of brackets 87 that are welded to the frame members 28. Between these flanges 85, the fuel tank 24 is formed with a generally horseshoe-shaped portion 88 that defines a channel 89 that underlies the forward portion of the seat 27, as shown in FIG. 7. This channel 89 is overlain by a downwardly extending flange 91 of the seat underplate 92. As a result, any water that is flowing with the air across the front cover 73 will be directed into the channel 89 and drained away from the sides of the seat 27 so as to avoid any possibility that the water can drain onto the seat.

An air inlet tube 93 is provided for an air silencer 94 that underlies the seat 27 and which delivers air to the carburetor 25. Hence, the air inlet device 93 will receive a copious amount of air, but no water can flow into the air inlet because of the protection aforenoted.

Referring again to FIG. 1, there is provided a further rear cover 95 which underlies the rear portion of the seat 27 and which has a pair of rear fenders 96 that overlie the rear wheel 16.

From the foregoing description, it should be readily apparent that the described vehicle body and frame assembly provides a very effective bumper which mounts along with the main body assembly to the frame assembly so as to facilitate servicing in addition, the front cover is also configured so as to direct water away from both the rider's seat and also the inlet for the engine induction system. Of course, the foregoing description is that of a preferred embodiment of the invention and various changes and modifications may be made without departure from the spirit and scope of the invention, as defined by the appended claims.

We claim:

1. A motor vehicle comprising a tubular frame assembly, a pair of front wheels and at least one rear wheel suspended from said tubular frame assembly, a front cover comprising a pair of front fenders each overlying a respective one of said front wheels and an intermediate portion bridging and integrally connecting said fenders in overlying relationship to a portion of said tubular frame assembly, and a front bumper of tubular construction having a pair of spaced-apart side members extending through openings in said front cover and detachably connected to said tubular frame assembly.

2. A motor vehicle as set forth in claim 1, wherein the front cover is detachably connected to the frame assembly.

3. A motor vehicle as set forth in claim 2, wherein the front bumper is removable from the frame assembly with the front cover in place.

4. A motor vehicle as set forth in claim 1, further including a cross member, said cross member extending between the spaced-apart side members of the front bumper, and at least one headlight mounted thereabove, said headlight being positioned above the front cover and above said front bumper so that light from the headlight will not be obstructed by said from bumper.

5. A motor vehicle as set forth in claim 4, wherein the front cover is detachably connected to the frame assembly.

6. A motor vehicle as set forth in claim 5, wherein the front bumper is removable from the frame assembly with the front cover in place.

7. A motor vehicle as set forth in claim 1, wherein the bumper spaced-apart side members each has a generally C-shaped tubular configuration and are integrally connected to a pair of reinforcing cross-members also formed of a tubular construction, said spaced-apart members and at least one of said cross-members each having a portion overlying the tubular frame assembly and detachably connected thereto.

8. A motor vehicle as set forth in claim 7, further including a heat exchanger supported by the bumper cross-members and disposed rearwardly thereof.

9. A motor vehicle as set forth in claim 8, further including a grill affixed to the cross-members and extending in front of the heat exchanger for protecting the heat exchanger.

10. A motor vehicle as set forth in claim 9, further including at least one headlight mounted on said cross-members, said headlight being positioned above the front cover and above the front bumper so that light from the headlight will not be obstructed by the front bumper.

11. A motor vehicle as set forth in claim 10, wherein the front cover is detachably connected to the frame assembly.

12. A motor vehicle as set forth in claim 11, wherein the front bumper is removable from the frame assembly with the front cover in place.

13. A motor vehicle as set forth in claim 1, further including a seat carried by the frame assembly and disposed rearwardly the front cover, the front cover having a portion underlying a forward edge of the seat cooperating with a channel formed by a fuel tank for accumulating water passing over the front cover and directing it away from the seat.

14. A motor vehicle as set forth in claim 13, further including an internal combustion engine positioned beneath the front cover and in part beneath the seat, and having an air induction system having an air inlet disposed beneath the seat and rearwardly of the channel.

\* \* \* \* \*